(12) United States Patent
Figotin et al.

(10) Patent No.: US 7,881,570 B2
(45) Date of Patent: Feb. 1, 2011

(54) PHOTONIC DEVICES HAVING DEGENERATE SPECTRAL BAND EDGES AND METHODS OF USING THE SAME

(75) Inventors: Aleksandr Figotin, Irvine, CA (US); Ilya M. Vitebskiy, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 339 days.

(21) Appl. No.: 11/720,592

(22) PCT Filed: Jan. 26, 2006

(86) PCT No.: PCT/US2006/003154

§ 371 (c)(1), (2), (4) Date: May 31, 2007

(87) PCT Pub. No.: WO2007/097739

PCT Pub. Date: Aug. 30, 2007

(65) Prior Publication Data

US 2009/0232464 A1 Sep. 17, 2009

(51) Int. Cl.
*G02B 6/34* (2006.01)
*G02B 6/10* (2006.01)
(52) U.S. Cl. .......................... 385/37; 385/129
(58) Field of Classification Search ............ 385/37, 385/122, 129, 133
See application file for complete search history.

(56) References Cited

U.S. PATENT DOCUMENTS 5,365,541 A 11/1994 Bullock
5,559,825 A 9/1996 Scalora et al.
5,689,275 A 11/1997 Moore et al.
5,751,466 A 5/1998 Dowling et al.
5,999,308 A 12/1999 Nelson et al.
6,130,780 A 10/2000 Joannopoulos et al.
6,134,043 A 10/2000 Johnson et al.
6,358,854 B1 * 3/2002 Fleming et al. ............. 438/692
6,414,780 B1 7/2002 D'Aguanno et al.
6,701,048 B2 3/2004 Figotin et al.
6,823,111 B2 * 11/2004 Jette et al. .................... 385/37
6,825,982 B1 11/2004 Ting (Continued)

OTHER PUBLICATIONS

A. Figotin, and I. Vitebsky. Nonreciprocal magnetic photonic crystals, Phys. Rev. E63, 066609 (2001).*

(Continued)

*Primary Examiner*—Rhonda S Peace
(74) *Attorney, Agent, or Firm*—Orrick, Herrington & Sutcliffe, LLP

(57) ABSTRACT

Provided herein are photonic devices configured to display photonic band gap structure with a degenerate band edge. Electromagnetic radiation incident upon these photonic devices can be converted into a frozen mode characterized by a significantly increased amplitude, as compared to that of the incident wave. The device can also be configured as a resonance cavity with a giant transmission band edge resonance. In an exemplary embodiment, the photonic device is a periodic layered structure with each unit cell comprising at least two anisotropic layers with misaligned anisotropy. The degenerate band edge at given frequency can be achieved by proper choice of the layers' thicknesses and the misalignment angle. In another embodiment, the photonic device is configured as a waveguide periodically modulated along its axis.

5 Claims, 15 Drawing Sheets

U.S. PATENT DOCUMENTS

| | | | |
|---|---|---|---|
| 7,072,555 | B1 | 7/2006 | Figotin et al. |
| 2001/0019565 | A1* | 9/2001 | Iwasaki et al. ............... 372/39 |
| 2002/0018298 | A1 | 2/2002 | Miller et al. |
| 2002/0064343 | A1* | 5/2002 | Ukechi ........................ 385/39 |
| 2002/0162988 | A1* | 11/2002 | Figotin et al. ......... 252/62.51 R |
| 2004/0008928 | A1 | 1/2004 | Gerken et al. |
| 2004/0013361 | A1 | 1/2004 | Chen et al. |
| 2004/0218651 | A1 | 11/2004 | Iwasaki et al. |

OTHER PUBLICATIONS

M. G. Krein et al., "Four Papers on Ordinary Differential Equations", American Mathematical Society Translations, Providence, R.I., Series 2, vol. 120, pp. 1-70 (1983).

A. Figotin et al., "Electromagnetic Unidirectionality in Magnetic Photonic Crystals", Physical Review B 67, 165210 (2003), pp. 1-20.

A. Figotin et al., "Nonreciprocal Magnetic Photonic Crystals", Physical Review E., vol. 63, 066609 (2001), pp. 1-17.

I. Abdulhalim, "Analytic propagation matrix method for anisotropic magneto-optic layered media", J. Opt A: Pure Appl. Opt. 2 (2000), pp. 557-564.

U.S. Appl. No. 12/131,897, Office Action, Oct. 10, 2009.

I. Abdulhalim, "Analytic propagation matrix method for linear optics of arbitrary biaxial layered media", J. Opt A: Pure Appl. Opt. 1 (1999), pp. 646-653.

Dwight W. Berreman, "Optics in Stratified and Anisotropic Media: 4 X 4-Matrix Formulation", Journal of the Optical Society of America, vol. 62, No. 4 (Apr. 1972), pp. 502-510.

A. Figotin et al., "Oblique Frozen Modes in Periodic Layered Media", Physical Review E 68, 036609 (2003), pp. 1-16.

J. Ballato et al., *Frozen light in periodic stacks of anisotropic layers*, Phys. Rev. E71, (2005).

A. Figotin and I. Vitebskiy, *Gigantic transmission band-edge resonance in periodic stacks of anisotropic layers*, Phys. Rev. E72, 036619, (2005).

A. Figotin and V. Gorentsveig, *Localized electromagnetic waves in a layered periodic dielectric medium with a defect*, Phys. Rev. B 58, 180 (Jul. 1998).

A. Vinogradov et al., *Surface state pecularities in one-dimensional photonic crystal interfaces*, Phys. Rev. B 74, 045128 (2006).

M. Scalora et al., *Ultrashort pulse propagation at the photonic band edge: Large tunable group delay with minimal distortion and loss*, Phys. Rev. E 54, No. 2, R1078 (Aug. 1996).

M. Bloemer et al., *Transit time of optical pulses propagating through a finite length medium*, Phys. Rev. E 65, 056615 (2002).

M. Soljacic et al., *Photonic-crystal slow-light enhancement of non-linear phase sensitivity*, J. Opt. Soc. Am. B 19, 2052 (Sep. 2002).

M. Notomi, *Photonic Crystals: Towards Ultrasmall Lightwave Circuits*, NTT Technical Review, vol. 2, No. 2 (Feb. 2004), pp. 36-47.

A. Figotin, and I. Vitebskiy, *Slow-wave resonance in periodic stacks of antisotropic layers*, Physical Review A 76, 053839 (2007).

S. Yarga et al., *Degenerate band edge crystals and periodic assemblies for antenna gain enhancement*, IEEE (2006), pp. 408-411.

A. Figotin and I. Vitebskiy, *Electromagnetic unidirectionality and frozen modes in magnetic photonic crystals*, J. Magn. Magn. Mater. 300 (2006)., pp. 117-121.

A. Figotin and I. Vitebskiy, *"Slow Light in Photonic Crystals"* Waves in Random and Complex Media, vol. 16, No. 3, (Aug. 2006), pp. 293-382.

A.Figotin and I.Vitebskiy, *Frozen light in photonic crystals with degenerate band edge*, Phys. Rev. E 74, 066613 (2006).

M. Selim Unlu and S. Strite, *Resonant cavity enhanced photonic devices*, J. Appl. Phys. 78(2) (1995), pp. 607-639.

J. Dowling et al., *The photonic band edge laser: A new approach to gain enhancement*, J. Appl. Phys. 75 (Feb. 1994), pp. 1896-1899.

J. Poon et al., *Designing coupled-resonator optical waveguide delay lines*, J. Opt. Soc. Am. B 21, No. 9 (Sep. 2004), pp. 1665-1673.

\* cited by examiner

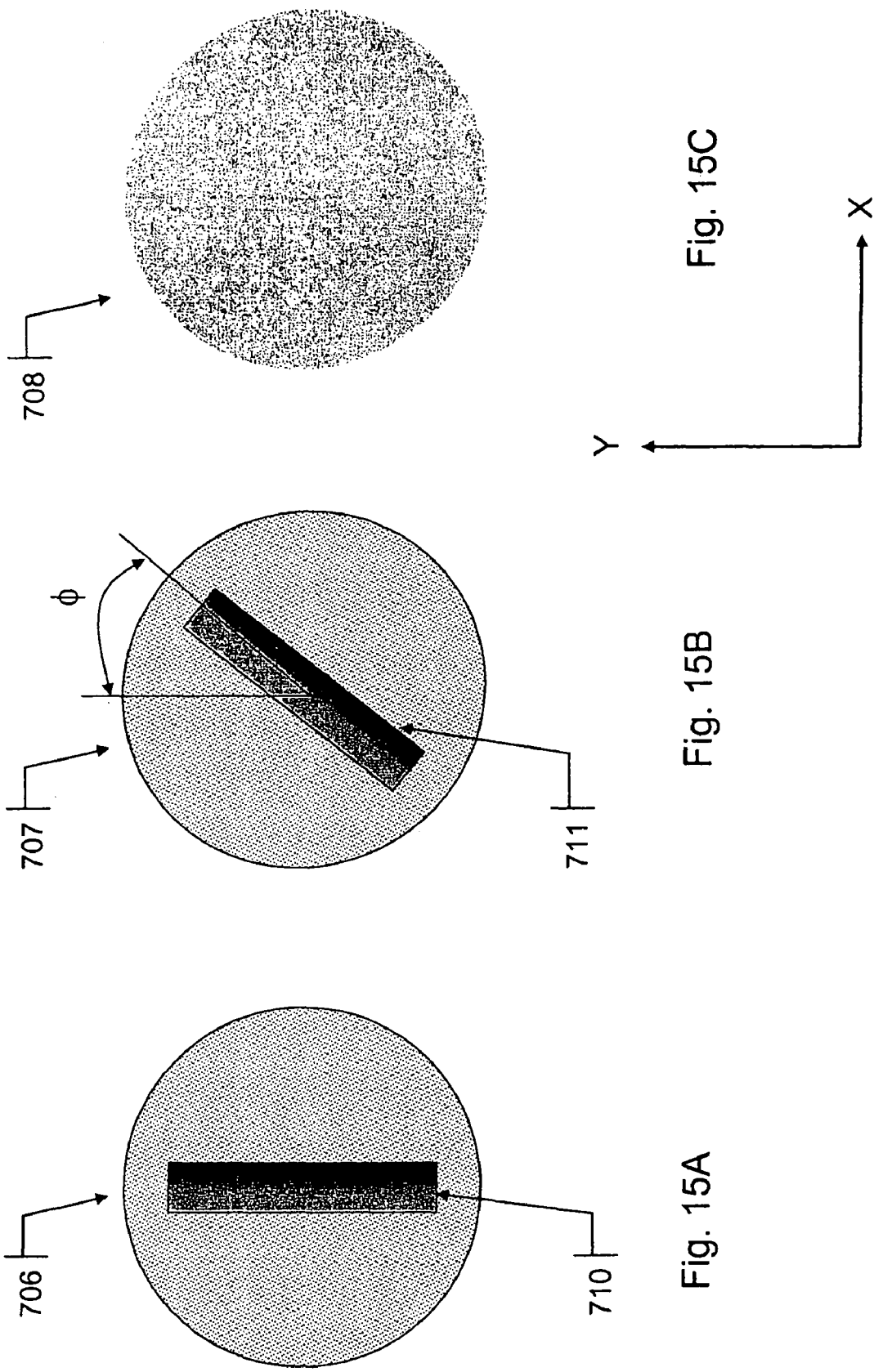

PHOTONIC DEVICES HAVING DEGENERATE SPECTRAL BAND EDGES AND METHODS OF USING THE SAME

This invention was made with Government support under grant number FA9550-04-1-0359, awarded by Air Force Office of Scientific Research, Air Force Materials Command, USAF. The Government has certain rights to this invention.

FIELD OF THE INVENTION

The invention relates generally to the field of photonic devices, and more particularly to systems and methods for transmitting and storing electromagnetic radiation in a photonic device with inhomogeneous spatially periodic structure.

BACKGROUND INFORMATION

The manipulation of electromagnetic energy can be advantageous to numerous applications within many industries. For instance, much effort has been focused on reducing the velocity of electromagnetic energy, such as light and microwave pulses. The reduced velocity of electromagnetic energy can facilitate manipulation of electromagnetic waves. It can also enhance the light-matter interaction essential in numerous optical and microwave applications. One approach to reducing the electromagnetic energy velocity is through the use of spatially inhomogeneous periodic media displaying strong spatial dispersion at operational frequencies. Spatial inhomogeneity results in strong nonlinear relation between the frequency $\omega$ of propagating electromagnetic wave and the respective Bloch wave number k. The relation $\omega(k)$ is referred to as dispersion relation or, equivalently, as k-$\omega$ diagram. At certain frequencies, the wave group velocity $v=d\omega/dk$ vanishes implying extremely low energy velocity.

One common photonic device exploiting spatial inhomogeneity is a photonic crystal. This device is typically composed of multiple repeating segments (unit cells) arranged in a periodic manner. Electromagnetic frequency spectrum of a typical photonic crystal develops frequency bands separated by forbidden frequency gaps. The frequency separating a photonic band from adjacent photonic gap is referred to as a (photonic) band edge, or simply a band edge. At frequencies close to a photonic band edge, the relationship between the frequency $\omega$ and the wave number k can be approximated as $$\omega - \omega_g \propto (k - k_g)^2 \qquad (1)$$

implying that the respective group velocity $$v = d\omega/dk \propto k - k_g \propto \sqrt{\omega - \omega_g} \qquad (2)$$

vanishes as $\omega$ approaches the band edge frequency $\omega_g$. This creates conditions for very slow pulse propagation. Another common photonic device exploiting spatial inhomogeneity and providing conditions for slow energy propagation is a periodic array of weakly coupled resonators. There exist many different physical realizations of the individual resonators connected into the periodic chain.

One common drawback of current photonic devices employing spatial inhomogeneity is that only a small fraction of the incident electromagnetic radiation is converted into the slow electromagnetic mode, resulting in low efficiency of the device. Another common drawback of current photonic devices is the necessity to employ a large number of the said segments (unit cells) in order to achieve a desirable slowdown of electromagnetic energy. Accordingly, improved photonic devices are needed having smaller dimensions and allowing for more efficient manipulation of the incident electromagnetic radiation.

SUMMARY

The devices, systems and methods described in this section are done so by way of exemplary embodiments that are not intended to limit these devices, systems and methods in any way.

In one exemplary embodiment, a photonic system is provided that includes a photonic device configured to display a degenerate band edge, the photonic device including a first end, a second end, a first surface located on the first end and a plurality of segments coupled together between the first and second ends. Each segment can include a first anisotropic layer, a second anisotropic layer misaligned with the first anisotropic layer, and a third layer. The photonic device can be configured to convert an electromagnetic wave incident on the first surface into a frozen mode, where the electromagnetic wave operates at a frequency in proximity with the degenerate band edge.

In another exemplary embodiment, a photonic system is provided that includes a photonic device configured to display a degenerate band edge, the photonic device including a first end, a second end, a first surface located on the first end and a plurality of periodic segments coupled together between the first and second ends. Each segment can include a first anisotropic layer having a first thickness and a second anisotropic layer misaligned with the first anisotropic layer and having a second thickness different from the first thickness. The photonic device can be configured to convert an electromagnetic wave incident on the first surface into a frozen mode, when the electromagnetic wave operates at a frequency in proximity with the degenerate band edge.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention not be limited to the details of the example embodiments.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIGS. 10-15C are block diagrams depicting additional exemplary embodiments of a photonic device displaying degenerate photonic band edge.

DETAILED DESCRIPTION

Photonic devices and systems having degenerate spectral band edges and methods for using the same are described herein. These devices, systems and methods are based on the physical idea of using spatially periodic structures displaying a degenerate band edge $$\omega - \omega_d \propto (k - k_d)^4 \qquad (3)$$

rather then the regular band edge described by equation (1). Unlike the regular band edge (1), display of the degenerate band edge (3) allows for the frozen mode regime, accompanied by a complete conversion of the incident radiation into a slow mode with a drastically enhanced amplitude. In addition, a resonance cavity incorporating a photonic device displaying a degenerate band edge can have much smaller relative dimensions compared to those incorporating existing photonic devices.

Light transmitting periodic structures that can be configured to display the degenerate band edge (3) include, but are not limited to: (i) photonic crystals, such as periodic layered structures, as well as structures with two and three dimensional periodicity, (ii) spatially modulated optical and microwave waveguides and fibers, and (iii) arrays of coupled resonators. The embodiments discussed below are directed towards periodic arrays of anisotropic dielectric layers; however, it is important to emphasize that the underlying reason for the enhanced performance of the photonic device as described herein lies in the existence of a degenerate band edge (3) in the respective frequency spectrum. Specific physical realization of the periodic structure displaying such a spectrum is determined by practical needs, i.e., one of ordinary skill in the art will readily recognize how to implement spatially modulated optical and microwave waveguides and fibers, arrays of coupled resonators and other desired structural configurations based on the embodiments described herein.

Figure 1:
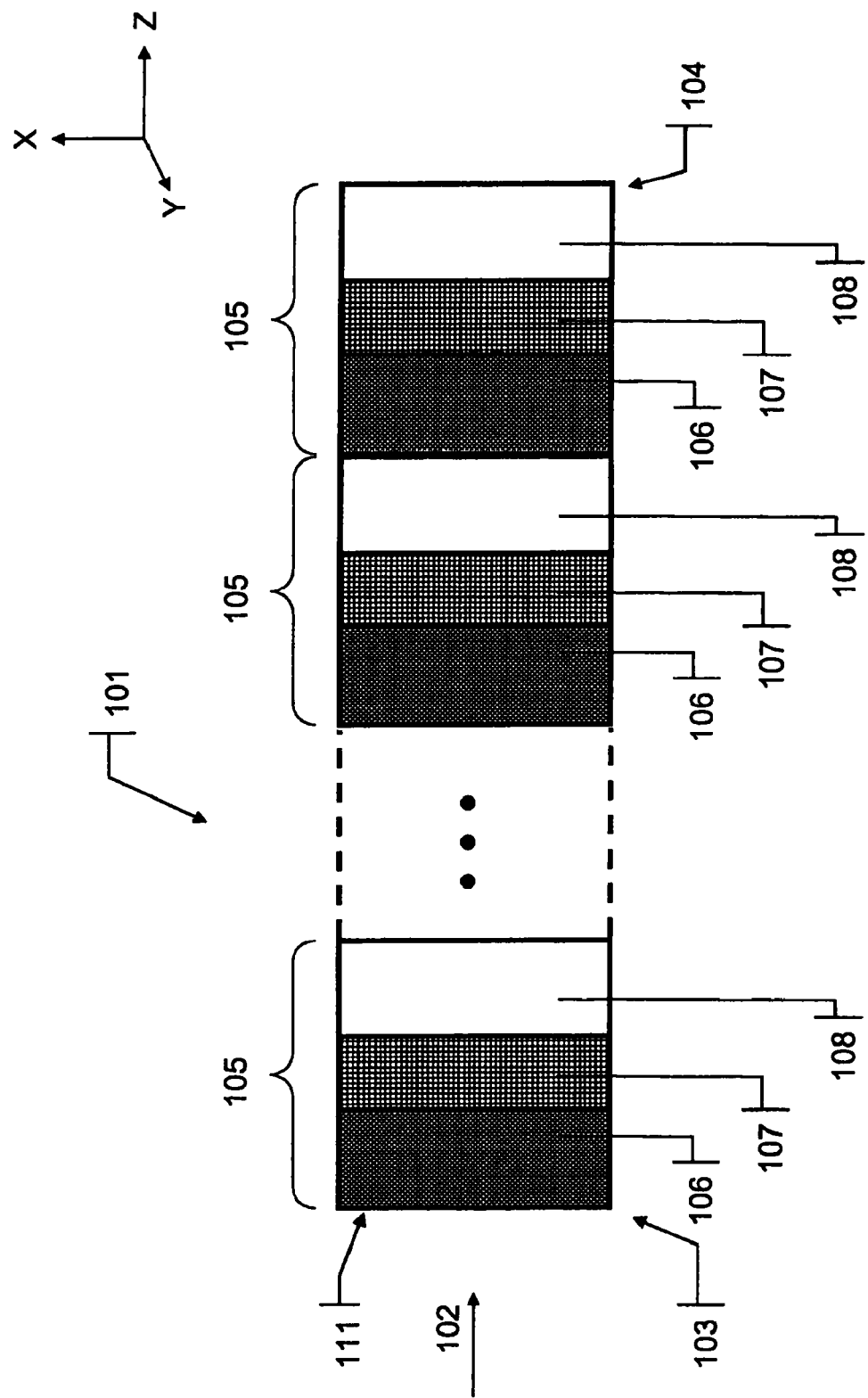
FIGS. 1-2 are block diagrams depicting exemplary embodiments of a photonic device.

FIG. 1 is a block diagram depicting one exemplary embodiment of a photonic device 101 configured to display a degenerate spectral band edge (3). FIG. 1 depicts an electromagnetic wave 102 incident a surface 111 of device 101. In this embodiment, photonic device 101 includes a plurality of segments (unit cells) 105 coupled together between a first end 103 and a second end 104 of the device 101. Each segment 105 can include a first anisotropic layer 106, a second anisotropic layer 107, and a third optional layer 108. The third layer 108 can be made of either isotropic or anisotropic material, or it can be omitted entirely. The Z direction is normal to layers 106-108. The thickness of segment 105 in the Z direction is preferably of the same order of magnitude as the wavelength of the incident wave 102. Each of the three layers 106-108 has a plane-parallel configuration with a uniform thickness (measured in the Z direction) and composition, although these conditions may not be necessary. The thickness of each of layers 106-108 can be different from each other in accordance with the needs of the application.

In this embodiment, the structure of photonic device 101 is periodic along the Z direction perpendicular to layers 106-108, which are parallel to the X-Y plane. The X, Y and Z directions are perpendicular to each other like that of a standard Cartesian coordinate system. Photonic device 101 is also preferably homogeneous in the in-plane directions X and Y, although photonic device 101 can also be inhomogeneous in the directions X, Y, or both, if desired. The total number N of repeating segments 105 in photonic device 101 depends on the specific application and usually varies between three and several hundred, although device 101 is not limited to this range of segments 105.

The anisotropy axes of anisotropic layers 106 and 107 preferably have misaligned orientation in the X-Y plane with the misalignment angle φ being different from 0 and π/2. In this embodiment, anisotropic layers 106 and 107 are composed of the same anisotropic dielectric material and have a variable misalignment angle. The dielectric permittivity tensors of the three constitutive layers 106, 107 and 108 can be chosen as follows:

$$\varepsilon_{A1} = \begin{bmatrix} \varepsilon + \delta & 0 & 0 \\ 0 & \varepsilon - \delta & 0 \\ 0 & 0 & \varepsilon_{zz} \end{bmatrix}, \qquad (6)$$

$$\varepsilon_{A2} = \begin{bmatrix} \varepsilon + \delta\cos2\varphi & \delta\sin2\varphi & 0 \\ \delta\sin2\varphi & \varepsilon - \delta\cos2\varphi & 0 \\ 0 & 0 & \varepsilon_{zz} \end{bmatrix},$$

$$\varepsilon_B = \begin{bmatrix} 1 & 0 & 0 \\ 0 & 1 & 0 \\ 0 & 0 & 1 \end{bmatrix},$$

where $\in_{A1}$, $\in_{A2}$ and $\in_B$, are the dielectric permittivity tensors for the layers 106, 107 and 108, respectively. The choice (6) for the material tensor $\in_B$ corresponds to the case where layer 108 is an empty gap between the adjacent pairs of anisotropic layers 106 and 107. If desired, optional layer 108 can also be filled with either anisotropic or isotropic material, such as glass, air, active or nonlinear medium, etc., or it can be left vacant (e.g., as a vacuum), depending on the specific practical needs of the application. The quantity δ in (6) describes inplane anisotropy of the A-layers 106 and 107, essential for the existence of degenerate band edge. The parameter φ in (6) designates the misalignment angle between anisotropic layers 106 and 107. It can be chosen anywhere between 0 and π, which provides additional tunability of the photonic device. The k-ω diagram of the photonic device in FIG. 1 can develop degenerate band edge (3) only if the misalignment angle φ is other than 0 and π/2. A typical value for the misalignment angle φ is π/4. If desired, the tensor anisotropy (6) of layers 106 and 107 can be replaced with similar shape anisotropy of the respective X-Y cross sections, i.e., anisotropy can be induced with only isotropic materials through the shape or configuration of the X-Y cross section of the respective layers (e.g., the X-Y cross section is shaped as a, rectangle, ellipse or the like). Additional exemplary embodiments with modulated X-Y cross-sections are described with respect to FIGS. 10-13.

Figure 2:
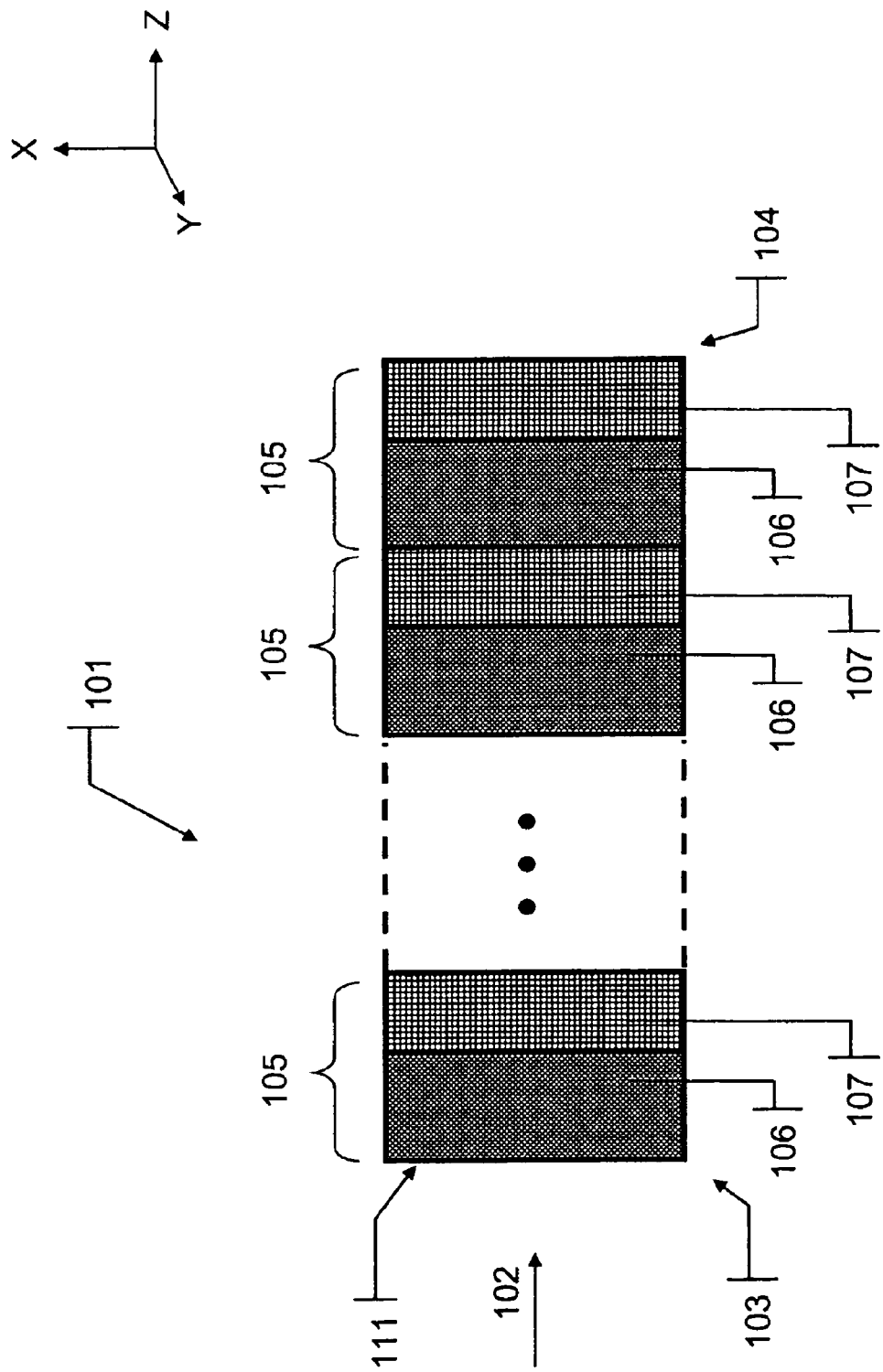
Figure 3:
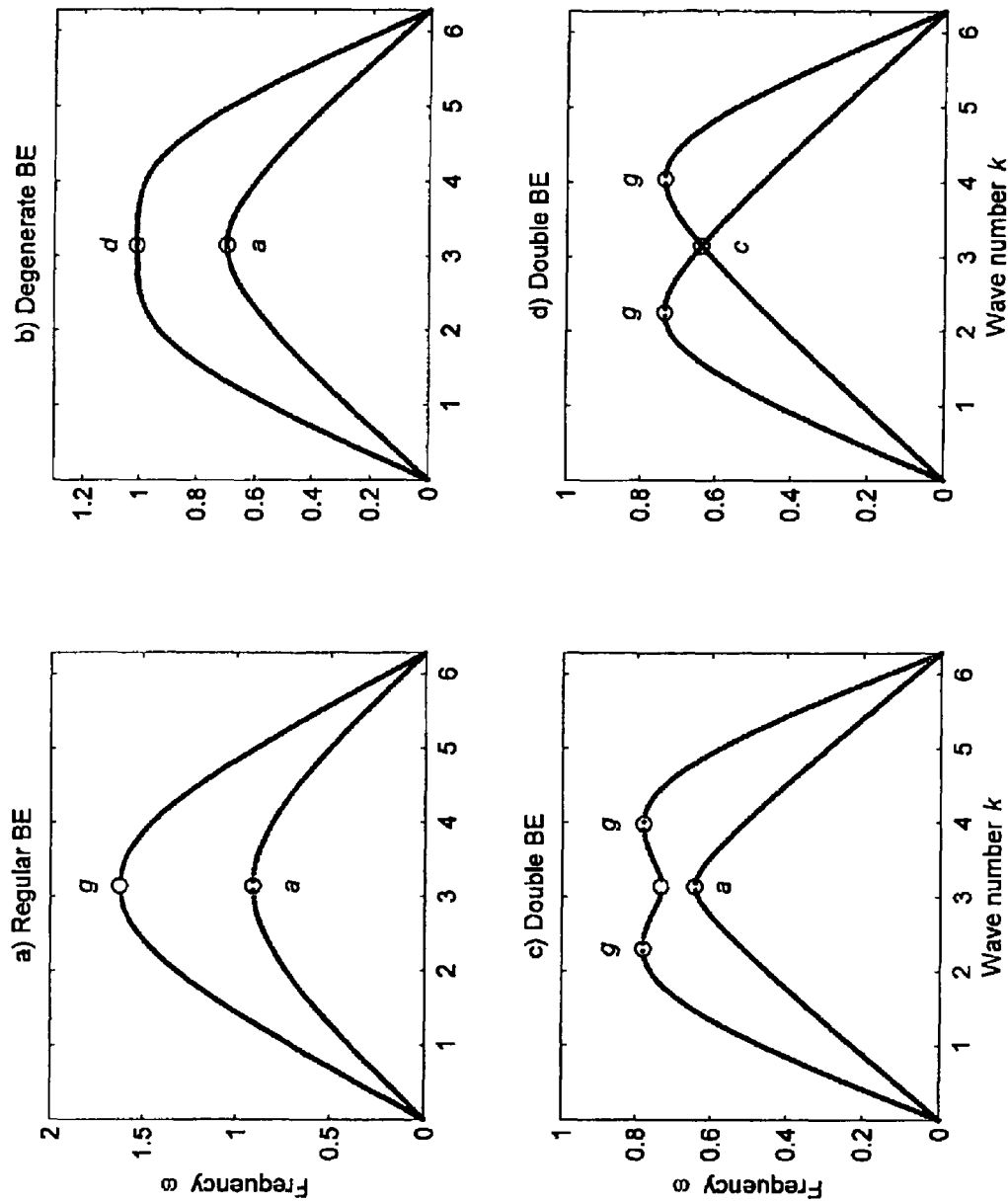
FIGS. 3A-D are graphs depicting exemplary k-$\omega$ diagrams of embodiments of the photonic device described with respect to FIG. 1 corresponding to different geometrical parameters of the photonic device.

FIG. 2 is a block diagram depicting another exemplary embodiment of photonic device 101 configured to display the degenerate band edge. This embodiment is similar to the embodiment described with respect to FIG. 1 except each layer 108 is omitted. In this case, anisotropic layers 106 and 107 preferably have different thicknesses and/or different permittivity tensors $$\varepsilon_{A1} = \begin{bmatrix} \varepsilon_1 + \delta_1 & 0 & 0 \\ 0 & \varepsilon_1 - \delta_1 & 0 \\ 0 & 0 & \varepsilon_{1zz} \end{bmatrix}, \quad (7)$$

$$\varepsilon_{A2} = \begin{bmatrix} \varepsilon_2 + \delta_2\cos2\varphi & \delta_2\sin2\varphi & 0 \\ \delta_2\sin2\varphi & \varepsilon_2 - \delta_2\cos2\varphi & 0 \\ 0 & 0 & \varepsilon_{2zz} \end{bmatrix}.$$

Otherwise, the characteristics of this embodiment in FIG. 2 would be very similar to that of the embodiment described with respect to FIG. 1.

FIGS. 3A-D are graphs depicting the k-ω diagram for the embodiment of photonic device 101 described with respect to FIG. 1 for four different values of the thickness of the B layer 108, respectively. In the graph depicted in FIG. 3B, the upper dispersion curve develops degenerate band edge d described in (3) and associated with the frozen mode regime. (In FIG. 3B, the frequencies above band edge d can be referred to as the frequency gap or photonic gap, while frequencies below band edge d can be referred to as the frequency band or photonic band.) The embodiment of photonic device 101 described with respect to FIG. 1 can develop degenerate band edge d, provided that the misalignment angle φ between the adjacent anisotropic layers 106 and 107 is different from 0 and π/2. If the physical parameters, such as the layer thicknesses and/or the misalignment angle φ, of photonic device 101 deviate from those corresponding to the situation depicted in FIG. 3B, the degenerate band edge d turns into a regular band edge g described in (1) and depicted in FIGS. 3A, 3C and 3D. The k-ω diagram depicted in FIG. 3D corresponds to the case where the B layers 108 are absent.

Figure 4:
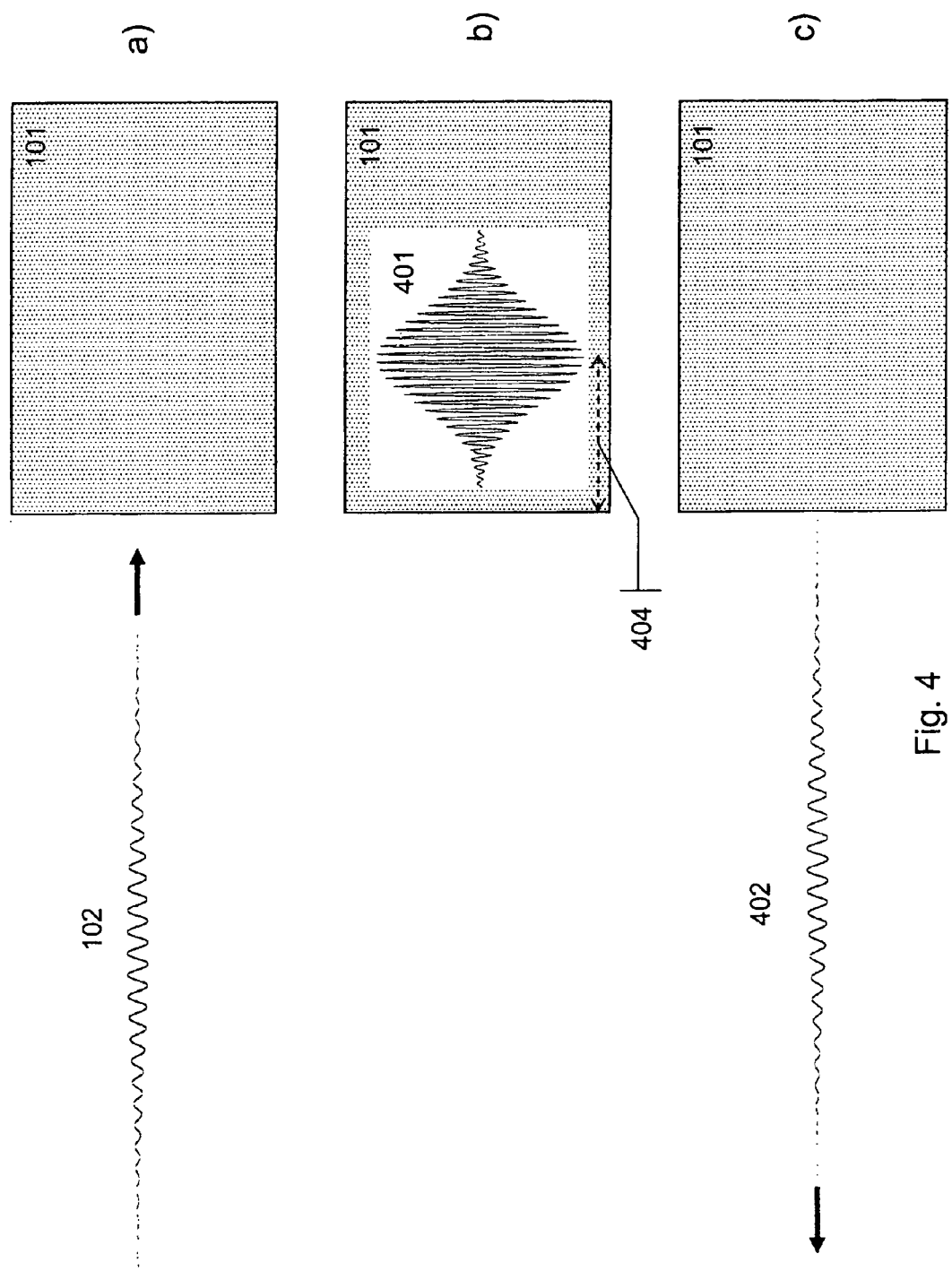
FIGS. 4A-C are block diagrams depicting performance of an exemplary embodiment of the photonic device in the frozen mode regime at frequencies close to the degenerate band edge.

FIGS. 4A-C are schematic diagrams depicting a photonic device 101 during three stages of the frozen mode regime. Photonic device 101 shown here is configured similar to that of the photonic device embodiment described with respect to FIG. 1. Here, the frozen mode regime occurs for an incident electromagnetic pulse 102 with a central frequency close to that of the degenerate band edge d depicted in FIG. 3B. FIG. 4A depicts incident pulse 102 propagating towards the surface 111 of photonic device 101. FIG. 4B depicts the situation after pulse 102 has reached surface 111 and has been transmitted into device 101 and converted into the frozen mode pulse 401. Here, the frozen mode 401 is characterized by an enhanced pulse amplitude and compressed pulse length, compared to those of the incident pulse 102. FIG. 4C depicts the situation after the frozen pulse 401 exits the photonic device 101 and turns into a reflected wave 402. The distance 404 through which the frozen mode pulse 102 is transmitted inside photonic device 101, as well the degree of amplitude enhancement, are strongly dependent on the pulse bandwidth and the central frequency. The frozen mode amplitude will typically increase with decreasing bandwidth and lesser difference between the central frequency and the degenerate band edge.

Figure 5:
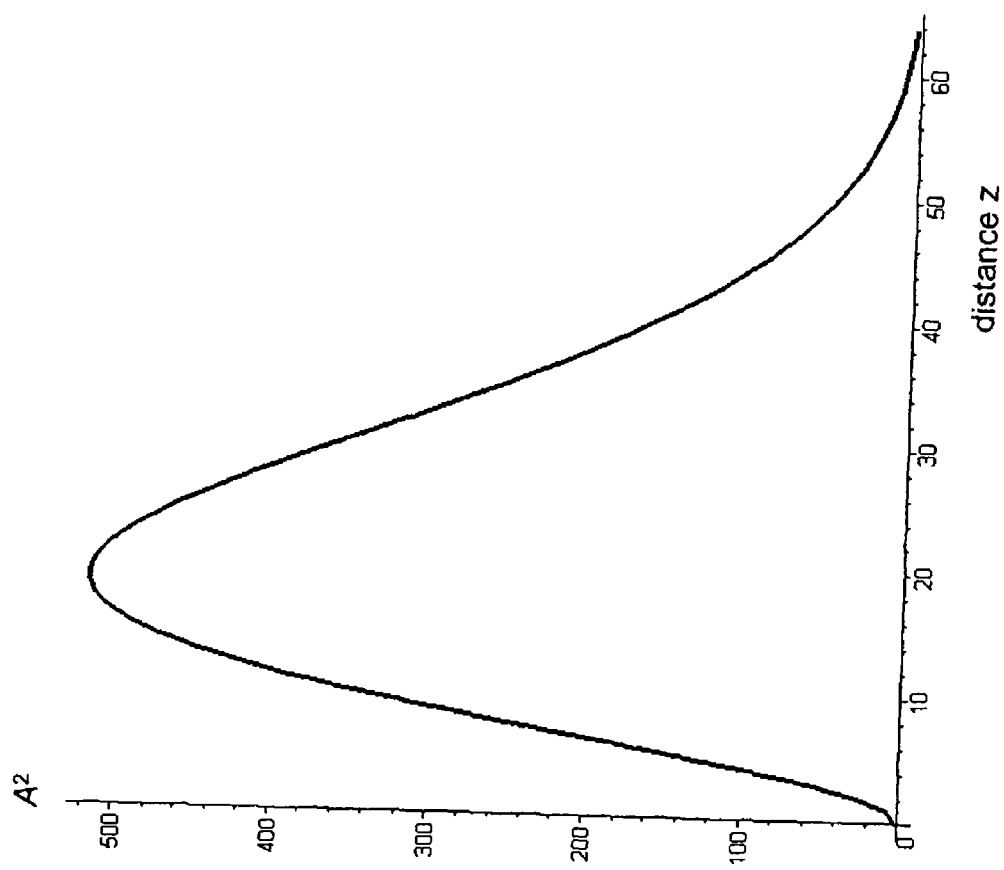
FIG. 5 is a graph depicting an exemplary frozen mode profile at steady-state regime.

FIG. 5 is a graph depicting an exemplary smoothed frozen mode profile at the steady-state frozen mode regime. In this example, the amplitude of the incident wave is unity. The point z=0 coincides with surface 111.

Figure 6:
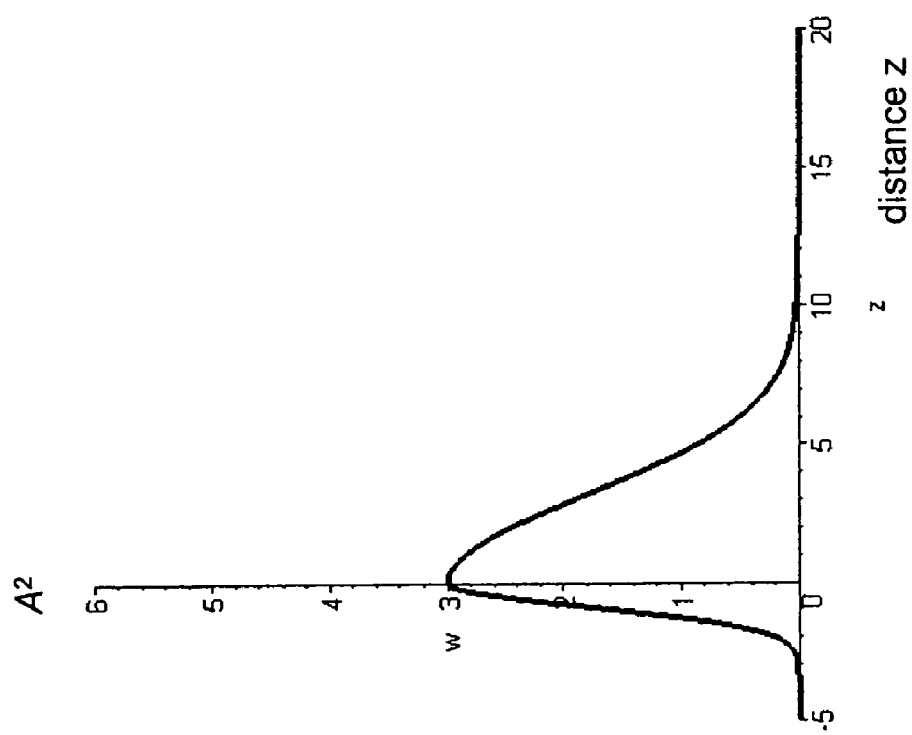
FIG. 6 is a graph depicting the profile of a typical electromagnetic surface wave at the air/photonic crystal interface of a photonic device.

FIG. 6 is a graph depicting a smoothed profile of a typical surface electromagnetic wave. Here, the field amplitude decays exponentially with the distance z from surface 111.

Figure 7:
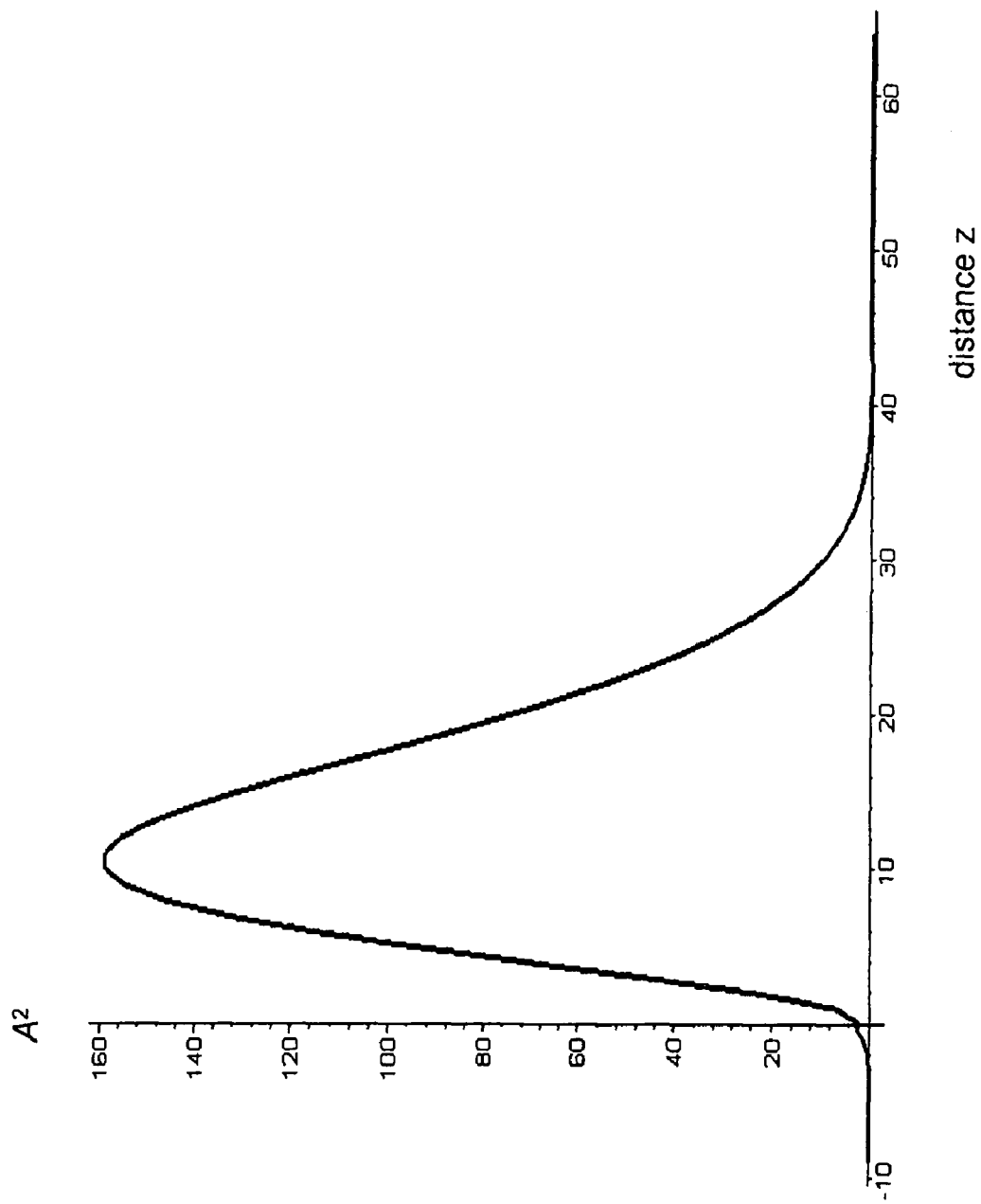
FIG. 7 is a graph depicting an exemplary profile of an abnormal surface wave at a frequency close to that of the degenerate band edge in an exemplary embodiment of the photonic device.

FIG. 7 is a graph depicting a smoothed profile of an exemplary abnormal surface wave associated with the degenerate band edge (3) of the electromagnetic spectrum. In this example, the field amplitude sharply rises inside photonic device 101, before decaying as the distance z from surface 111 further increases. The magnitude and the location of the field amplitude maximum sharply depend on the wave frequency. Remarkably, the maximal amplitude of an abnormal surface wave can be reached at a significant distance from surface 111. The latter circumstance can suppress the energy leakage outside photonic device 101.

Figure 8:
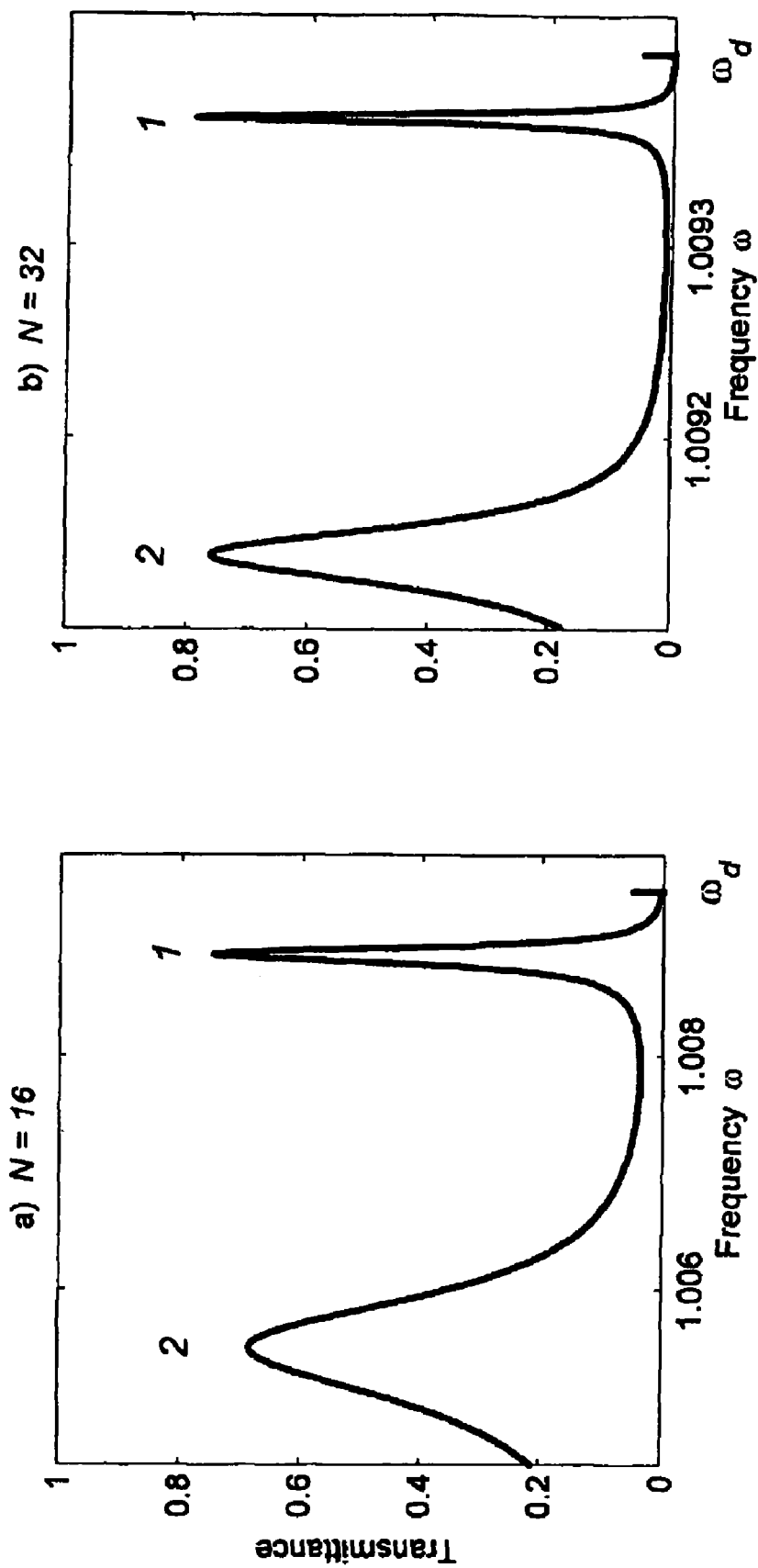
FIGS. 8-9 are graphs depicting performance of an exemplary embodiment of the photonic device in the regime of giant transmission band edge resonance.

FIG. 8 is a graph depicting a typical transmission dispersion of photonic device 101 with the k-ω diagram depicted in FIG. 3B. Here, N=16 (in FIG. 8A) and N=32 (in FIG. 8B) is the total number of segments 105 in device 101 and $\omega_d$ is the degenerate band edge frequency. The sharp peaks in the device transmittance correspond to giant cavity resonances, their exact position being dependent on the number N.

Figure 9:
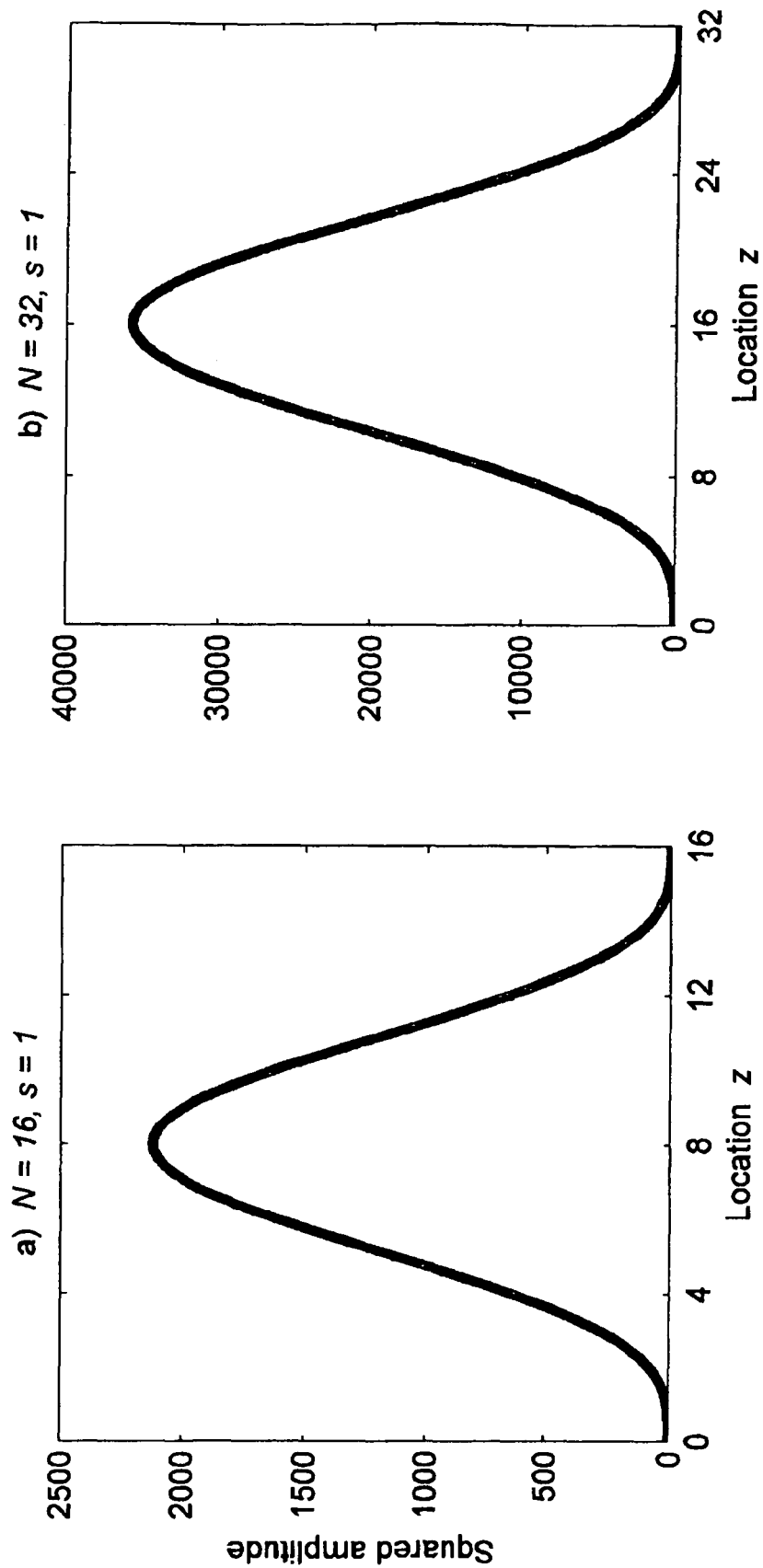

FIG. 9 is a graph depicting the smoothed field distribution $A^2(z)$ in photonic device 101 at the frequency of the rightmost giant transmission resonance closest to the degenerate band edge frequency $\omega_d$ depicted in FIG. 8, N=16 (in FIG. 9A) and N=32 (in FIG. 9B). The amplitude of the incident plane wave is unity, implying that the field enhancement in the case N=16 reaches 2000, while in the case N=32, the filed enhancement reaches 35000. To achieve similar performance in a common periodic array of isotropic layers, one would generally need at least several hundred layers in a stack.

Figure 10:
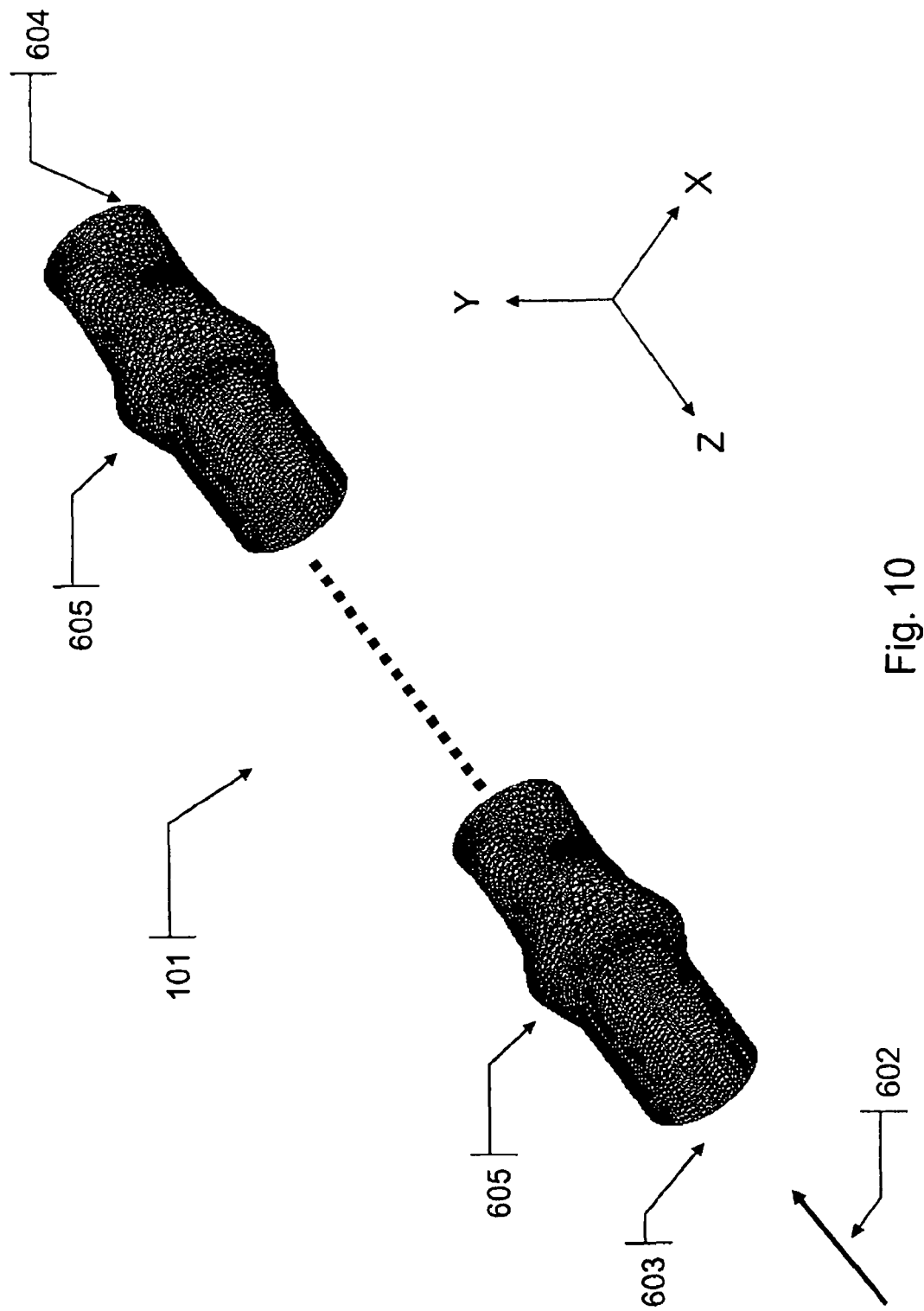
Figure 11:
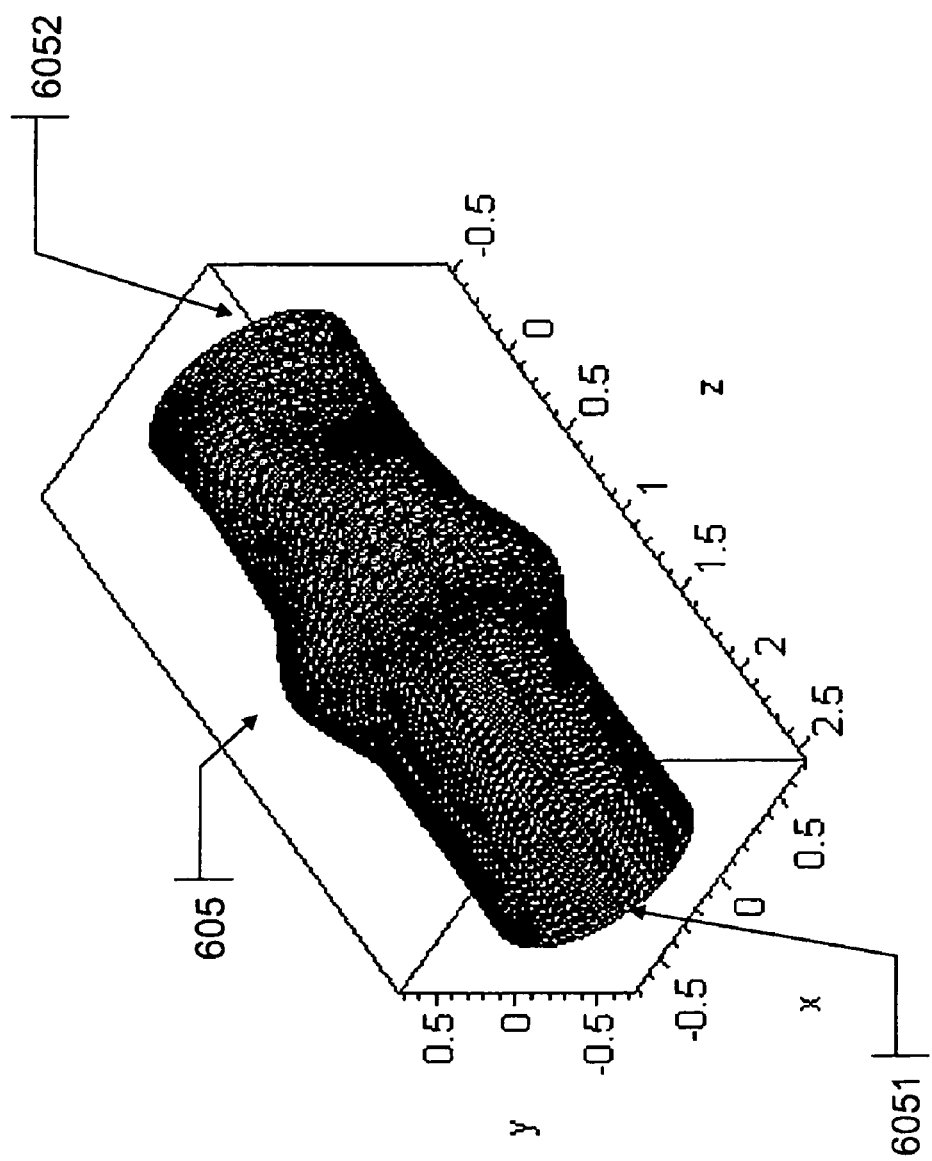

FIG. 10 is a block diagram depicting another exemplary embodiment of photonic device 101. Here, device 101 is a spatially periodic structure configured to display an electromagnetic k-ω diagram with a degenerate band edge (3). In this embodiment, device 101 is configured as a waveguide with an X-Y cross-section periodically modulated along the waveguide axis Z. In this embodiment, waveguide 101 includes a plurality of segments (unit cells) 605 coupled together between a first end 603 and a second end 604 of waveguide 101. Only the rightmost and the leftmost segments 605 are shown in FIG. 10. Each segment 605 has a variable cross-section depending on the coordinate Z, as shown in FIG. 11. The end cross-sections 6051 and 6052 are identical, to ensure smooth connection of adjacent segments 605 in the waveguide. At least at some Z, the X-Y cross-section of segment 605 is anisotropic in the X-Y plane. The term "anisotropic in the X-Y plane" implies that the axis Z of the waveguide is not an n-fold symmetry axis of this particular cross-section with n>2. The length of each segment 605 in the Z direction depends on operational frequency and is of the order of the respective electromagnetic wavelength.

Figure 12:
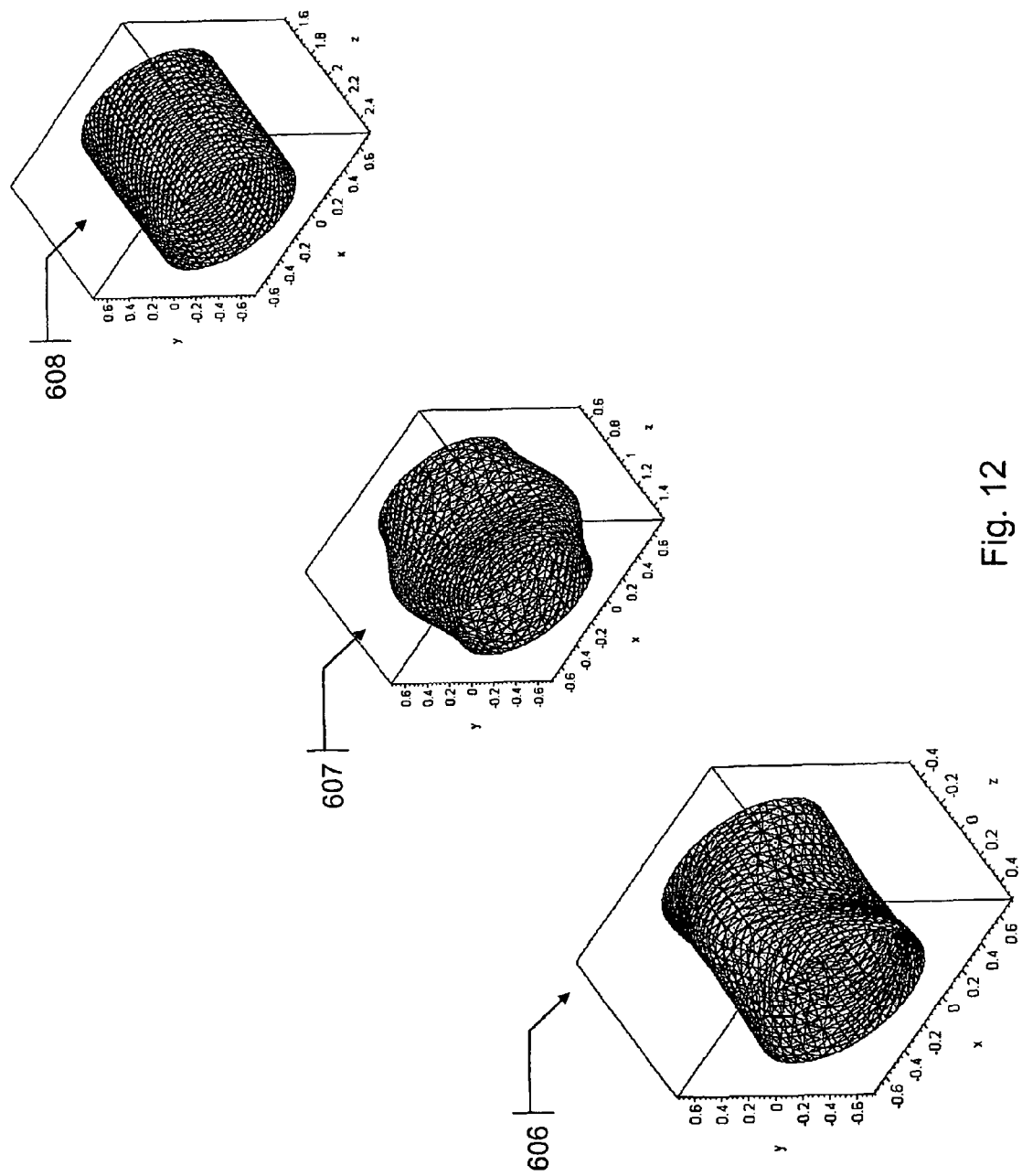
Figure 13C:
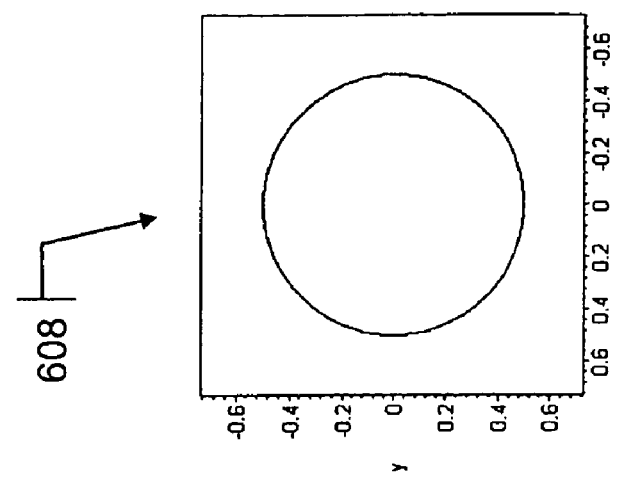
Figure 13B:
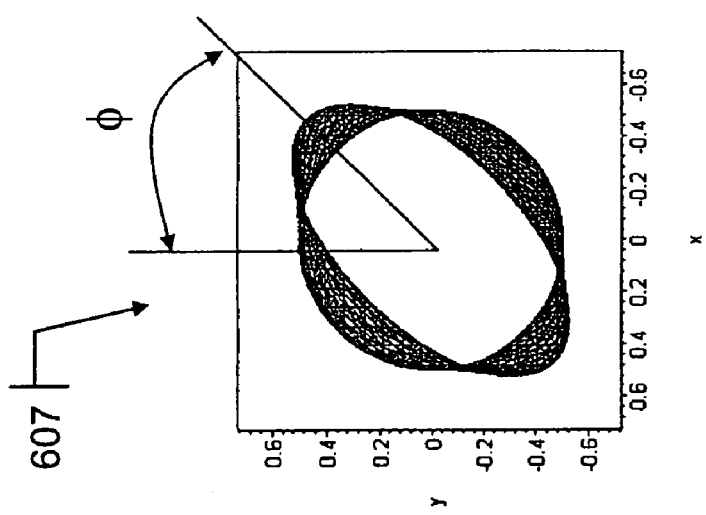
Figure 13A:
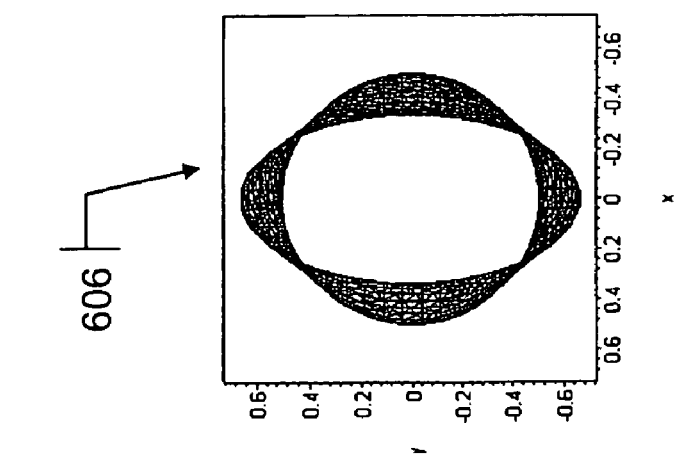

In one exemplary embodiment, each segment 605 can be subdivided into three adjacent portions 606-608, as depicted in FIG. 12 (portions 606-608 are shown here spaced apart from each other, although this would not be the case in the actual implementation). Portion 606 can be viewed as a circular section of the waveguide squeezed in the Y direction, so that its cross-section in the middle has an elliptical shape, as seen in FIGS. 12 and 13A. Portion 607 in FIGS. 12 and 13B can be similar to portion 606, but rotated about the Z axis by an angle φ, preferably different from 0 and π/2. In the embodiments depicted in FIGS. 10-13C, the misalignment angle φ is chosen π/4, although it is not limited to such. A third, optional portion 608, depicted in FIGS. 12 and 13C, can have circular, or any other cross-section, or it can be omitted altogether. The cross-sections at both ends of each of the three portions 606-608 are identical to ensure their smooth interface in the waveguide. In this example, the end cross-section is circular, although any desired shape can be used. One can view the shape anisotropy of portions 606, 607, shown in FIGS. 12 and 13A-B, as being analogous to the dielectric anisotropy (6) of the respective layers 106, 107 of the embodiment of the periodic layered structure 101 described with respect to FIG. 1. Portion 608 with a circular cross-section could be viewed as analogous to isotropic layer 108 in FIG. 1.

Again, waveguide 101 as depicted in FIG. 10 can be configured to display a degenerate band edge at desired frequency. By way of example, display of the degenerate band edge can be done as follows: (i) by adjusting the variable X-Y cross-section as a function of the axial coordinate Z, or (ii) by the proper choice of dielectric or other low-absorption materials filling the waveguide. It should be noted that waveguide 101 can display the electromagnetic band gap structure with a degenerate band edge in any manner and is not limited to just these two examples.

The input electromagnetic wave 602 enters waveguide 101 in FIG. 10 at end 603, similar to the embodiments described with respect to FIGS. 1-2. The optimal number of segments 605 in the device 601 can vary between three and several hundred or more, depending on the specific application.

If this embodiment of waveguide 101 is empty, or if it is filled with a uniform dielectric substance, the misaligned cross-section anisotropy of portions 606 and 607 may become required for the existence of degenerate band edge. But if the filling material is not distributed uniformly, as shown in the exemplary embodiments of FIGS. 14-15C, the variable cross-section can also be circular, square, or any other.

Figure 14:
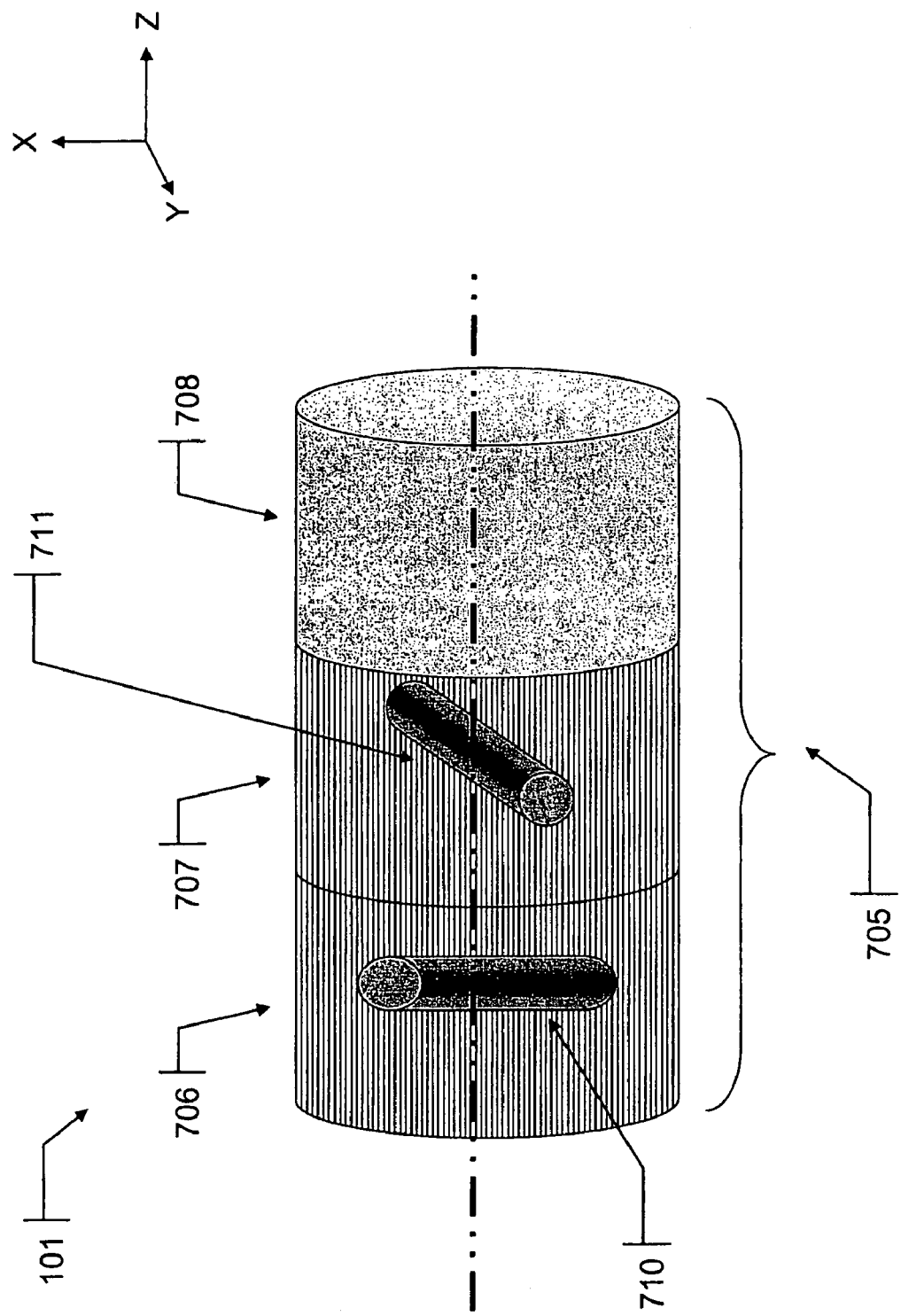

FIGS. 14-15C depict another exemplary embodiment of photonic device 101 as a waveguide configured to display the degenerate band edge in the electromagnetic k-ω diagram. In this exemplary embodiment, the effect of misaligned cross-sectional anisotropy of waveguide 101 is achieved by a non-uniform filling of waveguide 101, rather than by anisotropy of the shape of the external X-Y cross-section. Here, the non-uniform filling is provided by cylindrical insertions 710-711, although any manner of non-uniform filling can be used. In this embodiment with insertions 710-711, there are no essential restrictions on the shape of the X-Y cross-section of waveguide 101, for example, it can be circular, square, or any other. In this embodiment, the cross-section shape is circular and independent of Z (i.e., there is no periodic external shape modulation along the Z-direction, as in the exemplary embodiments described with respect to FIGS. 10-13). The photonic band gap structure in this case is created by a non-uniform filling (insertions 710-711) of waveguide 101. In FIG. 14, a single segment (unit cells) 705 of waveguide 101 is shown. The entire structure of waveguide 101 is obtained by repeating segment 705 in a periodic fashion along the waveguide axis, similar to the embodiments described with respect to FIGS. 1, 2 and 10.

In the exemplary embodiment depicted in FIG. 14, a single segment (a unit cell) 705 includes three contiguous portions 706, 707, 708, shown also separately in FIGS. 15A-C, respectively. One can view the role of portions 706 and 707 as being analogous to that of the respective layers 106 and 107 described with respect to FIG. 1, or portions 606 and 607 described with respect to FIG. 12. Specifically, portions 706 and 707 provide the misaligned structural anisotropy in the X-Y plane and, thereby, create the conditions for degenerate photonic band edge (3). In the embodiment depicted in FIG. 14, the anisotropy is created by misaligned cylindrical insertions 710 and 711, each of which is positioned in the center of the respective section and oriented perpendicular to the waveguide axis Z. The misalignment angle in the X-Y plane between insertions 710 and 711 is preferably different from 0 and π/2. It can be set, for example, as π/4, as shown in FIG. 15B, or it can be made variable to provide structural tunability. Portion 708 can be empty, or it can be filled with a uniform substance with low absorption at operational frequency range, or it can be omitted altogether. Otherwise, the description of photonic device 101; one segment 105 of which is depicted in FIG. 14, is similar to that in FIG. 10.

There can be a practically infinite number of specific waveguide realizations of photonic device 101 displaying the degenerate band edge (3). In the embodiment in FIG. 10, the desired effect is achieved by the misaligned shape anisotropy of the waveguide cross-section. In the embodiment in FIG. 14, the same effect is achieved by non-uniform filling of the waveguide. One can use any combination of these two embodiments, or one can also exploit the misaligned dielectric anisotropy of a periodic stratified structure, as described with respect to FIGS. 1-2. In any event, the electromagnetic band gap structure (i.e., the k-ω diagram) of photonic device 101 can develop a degenerate band edge (3) and, thereby, display the frozen mode regime, only if the periodic structure has the proper symmetry and possesses a certain degree of complexity. The embodiments described with respect to FIGS. 1-2 and 10-15C are only particular solutions or examples. One can use any combination of these embodiments or one can use other configurations not explicitly shown.

Described below are three exemplary methods in which photonic device 101 can be used. Each of the methods is referred to as an independent regime. It should be noted that operation in any one regime is dependent on the needs of the specific application, and that these regimes do not constitute an exhaustive list of potential uses for photonic device 101. In fact, photonic device 101 can be operated in any one or more of these three regimes as well as other regimes not explicitly described herein.

A first exemplary regime for photonic device 101 can be referred to as the frozen mode regime at degenerate band edge frequency. In this regime, an incident electromagnetic pulse 401 with central frequency close to that of the degenerate band edge is transmitted to photonic device 101, where it is converted into the frozen mode 402 having greatly enhanced amplitude and compressed length, similar to the exemplary embodiment described with respect to FIGS. 4A-C. Such a frozen mode does not propagate further through photonic device 101 than distance 404, and after a certain delay pulse is reflected back to space. During the time in which pulse 102 dwells inside photonic device 101, its amplitude can exceed that of the incident wave in air by several orders of magnitude. FIG. 5, which was previously described, depicts the steady-state realization of the frozen mode regime. The fact that the frozen mode amplitude is drastically enhanced compared to that of the incident wave can be used for enhancement of various processes resulting from light-matter interaction, for instance, higher harmonic generation, nonreciprocal Faraday rotation, light amplification by active media, etc. The frozen mode regime at degenerate band edge is fundamentally different from that associated with stationary inflection point and described in A. Figotin et al., U.S. Pat. No. 6,701,048. Indeed, in the case of stationary inflection point, the transmitted frozen mode slowly propagates through the photonic device until it reaches its opposite boundary or gets absorbed by the medium. By contrast, in the case of the degenerate band edge described herein, the incident wave is eventually reflected back to space, as illustrated in FIG. 4C.

A second exemplary regime for photonic device 101 can be referred to as the abnormal surface wave near degenerate band edge frequency regime. In the embodiments in FIGS. 1 and 2, the surface waves propagate along surface 111, normally to the Z direction. Typically, a surface wave rapidly decays with the distance from surface 111 between the photonic crystal and air, as depicted in FIG. 6. But, if the surface wave frequency is close to that of a degenerate band edge, the surface wave profile can change dramatically. The amplitude of such an abnormal surface wave sharply increases with the distance Z from the interface, before it starts to decay, as depicted in FIG. 7. The abnormal surface wave associated with degenerate band edge is much better confined inside photonic device 101 reducing the energy leakage outside the system, because the leakage rate is usually proportional to the squared field amplitude $A^2$ at the slab/air interface 111. This regime of abnormal surface wave is not exhibited in this precise manner in the exemplary embodiments of FIGS. 10-15C using a waveguide setting.

A third exemplary regime for photonic device 101 can be referred to as giant Fabry-Perot cavity resonance near the degenerate band edge frequency. Periodically modulated waveguides, periodic layered structures, as well as periodic arrays with 2 and 3 dimensional periodicity terminated by plane-parallel boundaries, are known to display sharp transmission cavity resonances at frequencies close to a photonic band edge. This phenomenon has been widely used in resonance cavities for varies practical purposes. In the case of a regular photonic band edge (1), the amplitude A of the resonance field inside the photonic cavity can be estimated as $$A \propto N A_0 \quad (4)$$

where $A_0$ is the amplitude of the incident plane wave. Strong cavity resonance can require a large number N of unit cells (e.g., segments 105, 605 and 705) in the periodic structure. A similar resonance effect occurs in periodic structures in the vicinity of the degenerate photonic band edge (3), as depicted in FIG. 8. One difference though is that in the latter case, the resonance field amplitude is estimated as $$A \propto N^2 A_0 \quad (5)$$

and referred to as the giant transmission band edge resonance. This shows that a Fabry-Perot cavity based on photonic device 101 configured to display the degenerate band edge is much more efficient than previous versions. For instance, a resonance cavity with the degenerate band edge based on an exemplary embodiment of device 101 having 10 periodic segments (e.g, 105, 605 or 705), or unit cells, can perform as well as a regular Fabry-Perot photonic cavity composed of 100 periodic segments. The optimal number of segments (e.g, 105, 605 or 705) in the resonance cavity depends on specific application, but in any event, cavities based on photonic device 101 configured to display the degenerate band edge can be much smaller.

The embodiments described with respect to FIGS. 1-15C provide numerous advantages over conventional systems and devices. For instance, photonic device 101 does not have to include any magnetic components with strong Faraday rotation, as is the case in the devices described in A. Figotin et al., U.S. Pat. No. 6,701,048, entitled "Unidirectional Gyrotropic Photonic Crystal and Applications for the Same," which is fully incorporated by reference herein. Also, photonic device 101 can operate without the inclusion of layers with an oblique orientation of the anisotropy axis relative to the normal to the layers, similar to certain devices described in A. Figotin et al., U.S. patent application Ser. No. 10/839,117, filed May 3, 2004 and entitled "Systems and Methods for Transmitting Electromagnetic Energy in a Photonic Device," which is also fully incorporated by reference herein. In addition, the regime of the giant transmission resonance described above can be realized exclusively in the photonic devices configured to display degenerate photonic band edge (3). Additional information relating to photonic devices 101 configured to display degenerate band edges is contained in A. Figotin et al., "Gigantic Transmission Band-Edge Resonance in Periodic Stacks of Anisotropic Layers," Physical Review E 72, 036619, published Sep. 29, 2005, which is also fully incorporated by reference herein.

Photonic device 101 can be incorporated in numerous photonic systems implemented in a myriad of applications. For instance, photonic device 101 can be implemented as a tunable delay line, an efficient nonlinear element used for frequency conversion, wave mixing and the like, it can also be used as a high performance resonance cavity in an optical amplifier and in a laser, a host for a multi-dimensional optical network, an incident wave receiver and the like. It should be noted that these examples are not intended to limit, in any way, the systems and methods in which photonic device 101 can be used. Nor are these examples intended to limit photonic device 101 to any one type of system, application or technology.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A photonic device, comprising:
a periodic structure having an electromagnetic dispersion relation that exhibits a frequency gap with a degenerate band edge for an input electromagnetic wave propagating in a first direction, wherein the structure is periodic in the first direction, wherein the structure is configured as an electromagnetic waveguide comprising a plurality of periodic segments and wherein the first direction is a Z direction and each segment has a variable cross-sectional shape measured along a X-Y plane formed by an X direction and a Y direction, the X direction being perpendicular to the Z direction and the Y direction being perpendicular to the X and Z directions.

2. The photonic device of claim 1, wherein the structure is a fiber configured to operate over a frequency range in the optical portion of the electromagnetic spectrum.

3. The photonic device of claim 1, wherein the cross-sectional shape of at least a portion of each segment is anisotropic in the X-Y plane.

4. A photonic device, comprising:

a periodic structure having an electromagnetic dispersion relation that exhibits a frequency gap with a degenerate band edge for an input electromagnetic wave propagating in a first direction, wherein the structure is periodic in the first direction, wherein the structure is configured as an electromagnetic waveguide comprising a plurality of periodic segments and wherein each of the segments comprises a first portion and a second portion located successively along the first direction, the first portion comprising a first non-uniform material and the second portion comprising a second non-uniform material, wherein the first portion has an anisotropy in the X-Y plane misaligned from an anisotropy of the second portion.

5. The photonic device of claim 4, wherein each of the segments comprises a third isotropic in the X-Y plane portion.

* * * * *